DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 714

T869,015

STABLE SOLUTIONS OF POLYESTERS OF TEREPHTHALIC ACID AND 2,2,4,4-TETRAMETHYL-1,3 - CYCLOBUTANEDIOL (HIGH TRANS CONTENT)

Max F. Meyer, Jr., Robert L. Combs, and Willis C. Wooten, Jr., all of P.O. Box 511, Kingsport, Tenn. 37662

Filed Aug. 11, 1969, Ser. No. 849,155
Int. Cl. C08g *51/30*
U.S. Cl. 260—33.8
No Drawing. 10 Pages Specification

Polyesters of terephthalic acid and 2,2,4,4-tetramethylcyclobutanediol having a trans isomer content of at least about 65%, not only are incapable of being processed in the melt without degradation but unlike the polyesters of cis form cannot be put effectively into solutions which are stable at room temperature, that is, solutions which remain solutions at room temperature for a reasonable period of time. A process has been found for providing room temperature-stable solutions of the high trans isomer content polyesters which process comprises dissolving the polyester in a chlorinated hydrocarbon having a boiling point of up to about 100° C. under superatmospheric pressure and at an elevated temperature sufficient to dissolve the polyester and then slowly cooling the resulting solution to room temperature while maintaining the solution under superatmospheric pressure. The use of chlorinated hydrocarbon solvents having boiling points falling below 100° C. is important in the acquisition of room temperature-stable solutions of the high trans content polyesters for use of other solvents in the process, although solubilizing the polyester, fails to provide room temperature-stable solutions. The preferred chlorinated hydrocarbon solvents are methylene chloride, chloroform and mixtures thereof. The temperature employed for dissolution of the polyester is usually in excess of 100° C., most often 150° C. The pressure employed throughout the process may vary over a wide range of from about 100 pounds per square inch (p.s.i.) on up depending on the temperature, solvent, reaction vessel volume and other variable factors. The maximum concentration of polyester in the chlorinated hydrocarbon which will remain dissolved at room temperature when processed in accordance with the invention is about 10% w./w. Preferably, the concentration is up to about 6% w./w.